March 10, 1931.  W. TURNBULL  1,795,581

FUEL TANK

Filed May 9, 1928

INVENTOR
William Turnbull
BY White, Prost & Fryer
ATTORNEYS

Patented Mar. 10, 1931

1,795,581

UNITED STATES PATENT OFFICE

WILLIAM TURNBULL, OF PEORIA, ILLINOIS, ASSIGNOR TO CATERPILLAR TRACTOR CO., OF SAN LEANDRO, CALIFORNIA, A CORPORATION OF CALIFORNIA

FUEL TANK

Application filed May 9, 1928. Serial No. 276,287.

My invention relates to fuel supply systems for engines, particularly to fuel tanks and relates especially to means for preventing the accidental overflow of fuel from the tank.

Systems for feeding fuel as constructed at the present time are almost invariably provided with a gasoline chamber having an air vent to the atmosphere. On vehicles, such as tractors, subject to violent changes in position and in inclination, gasoline is prone to spill out of the tank thru the air vent. It is often desirable to install the fuel tank near the engine and spilled fuel is not only lost but materially increases the fire hazard. This disadvantage is encountered in other installations as well but inasmuch as it is particularly noticeable in vacuum systems, I have described it in that connection.

It is therefore an object of my invention to provide means for preventing the escape of gasoline thru the atmospheric vent of a gasoline vacuum supply system.

Another object of my invention is to provide means for feeding gasoline to an engine by means of vacuum and at the same time to prevent such a system from being adversely affected by sudden changes in location or inclination of the engine.

The foregoing and other objects are attained in the embodiment of the invention shown in the drawings, in which Fig. 1 is a cross section of a fuel tank of a standard kind, the attachment of my invention being shown in side elevation.

Figure 1:
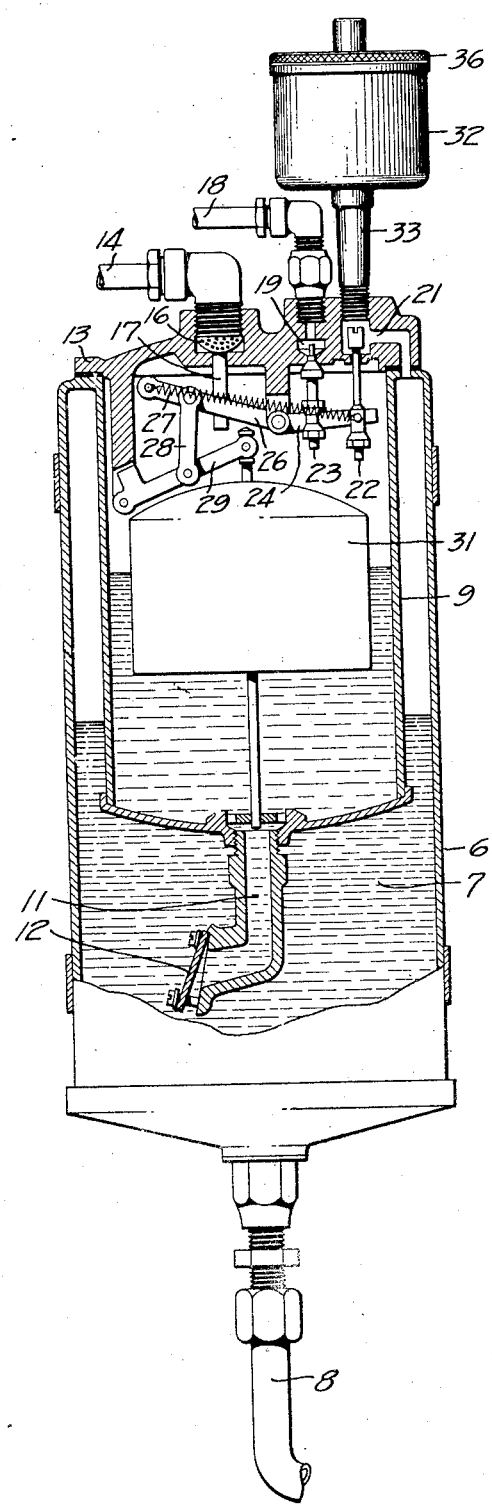
Figure 2:
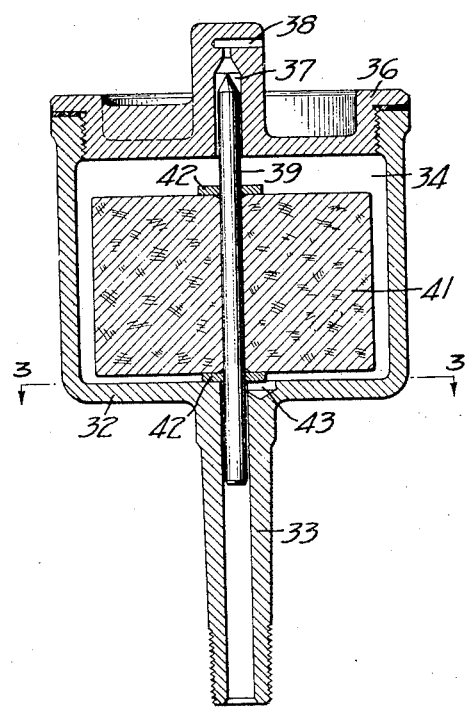
Fig. 2 is a cross section of the attachment of my invention, the plane of section being vertically thru a diameter.
Figure 3:
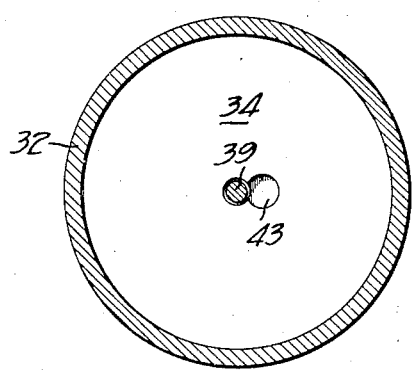
Fig. 3 is a cross section of the device shown in Fig. 2, the plane of section being indicated by line 3—3 of Fig. 2.

In its preferred form, my improvement includes a valve controlling the efflux of liquid from the fuel tank which is designed to be closed when the fuel attains a predetermined height.

The usual vacuum fuel feed system comprises a container 6 suitably located for permitting contained fuel 7 to run gravitally thru a fuel outlet 8 to the carbureter of the engine being supplied, not shown. Concentrically disposed within the container 6 is a housing 9. A passage 11 controlled at its outlet by a flap valve 12 permits communication between the container and the housing. The top of the container 6 is closed by a cap 13 making an air tight joint therewith and carrying control mechanism for the supply system. Secured to the cap and extending to a source of fuel, not shown, is a fuel inlet line 14 which is provided with a screen 16 and discharges thru a tube 17 into the interior of the housing 9, under the influence of a partial vacuum.

The sub-atmospheric pressure ordinarily existing in the intake manifold of the engine to which the vacuum system is attached is communicated to the interior of the housing 9 thru a pipe 18 secured to the cap 13 and extended by a passage 19. Formed in the cap 13 is a branched atmospheric vent 21 in communication with the interior of the container 6 and with the interior of the housing 9. Suitable valves 22 and 23 control the air vent 21 and the sub-atmospheric passage 19, respectively. These valves are actuated by a pair of levers 24 and 26 both pivoted to an extension on the cap and moved in the same direction, under the influence of a spring 27, by a link 28. To the link is connected a lever 29 actuated by a float 31 operating in the housing 9 in response to the level of liquid therein. As the float 31 rises and falls, the valves 22 and 23 are suitably actuated to vary the pressure within the housing periodically from atmospheric to sub-atmospheric and thus alternately to induct fuel thru the passage 14 into the housing 9 and to permit it to discharge therefrom into the container 6 from whence it flows to the engine.

When the fuel is at a relatively high level within the container 6 or within the housing 9, it is liable to flow thru the passage 21 and escape thru the atmospheric air vent. To preclude this possibility I provide a body 32 preferably having an integral hollow stem 33 which, at its lower end, is threaded to be inserted within the atmospheric vent 21 of the cap 13. The body 32 is enlarged to afford a float chamber 34 closed at its upper side by a cap 36. In alinement with the passage in the hollow stem 33 is an opening 37 in the cap 36 which communicates with the atmosphere thru a passage 38. Loosely slidable within the alined opening 37 and the duct piercing the stem 33 is a rod 39 at its upper end formed with a cone adapted to seat within the passage 37 and interrupt communication with the atmosphere. On the stem 39 is a float 41 of sufficient buoyancy to lift the rod 39 and prevent access to the atmosphere whenever a predetermined quantity of fuel flows thru the stem 33 into the float chamber 34. Since the junction of the float and the rod 39 is preferably reenforced by washers 42, I provide a passage around the lower washer 42 by drilling, as at 43, for a slight distance into the bottom of the body 32, thereby affording free passage around the loosely fitting rod 39 to the interior of the float chamber 34.

With the device of my invention secured to the atmospheric vent of a fuel tank, such as the vacuum tank illustrated, any liquid which surges thru the vent opening into the float chamber 34 immediately lifts the float, closes the opening 38 and blocks escape of the fuel. Thus, no fuel is spilled and the fire hazard is largely reduced.

It is to be understood that I do not limit myself to the form of device shown and described herein, as the invention, as set forth in the following claims may be embodied in a plurality of forms.

I claim:

1. A fuel tank comprising a container having an aperture thru which air passes from the atmosphere, and means for closing said aperture including a device responsive to liquid level above said container.

2. A fuel tank comprising a container having an atmospheric vent aperture therein, a body including a float chamber located above said container and communicating with said vent, a float in said chamber, and a valve responsive to said float for closing said vent.

3. A fuel tank comprising a liquid container periodically subject to vacuum, said container having an atmospheric vent aperture therein, a body including a float chamber located above said container and communicating with said vent, and a float controlled valve in said chamber for controlling communication thru said vent.

4. The combination with a fuel tank having a vent aperture of a body including a float chamber, a hollow stem on said body adapted to be received in the vent aperture of said fuel tank and to permit communication between said tank and said chamber, a cap on said body having an opening therethrough, a rod sliding in said stem and in said cap for closing said opening, and a float secured to said rod.

5. The combination with a fuel tank having a vent aperture of a body including a float chamber, a hollow stem integral with said body and supporting said body with said float chamber in communication with the vent aperture of said fuel tank, a cap on said body having an opening therethrough to the atmosphere, a rod loosely slidable in said stem and in said cap, said rod in one position being adapted to close said opening, and a float in said chamber for positioning said rod.

6. The combination with a fuel tank having an atmospheric vent aperture of a body having a float chamber therein, said body having an aperture to provide communication exteriorly of said chamber, an extension on said body, said extension being adapted to be secured to said vent aperture to provide a fluid communication with said fuel tank, a float in said chamber responsive to liquid therein and adapted in unfloated position to close substantially the fluid communication provided by said extension, a rod carried by said float, said rod being loosely slidable in said extension and being adapted to close the aperture in said chamber upon substantial lifting of said float, and means for admitting liquid to said chamber from said extension when said float is in a substantially unfloated position.

In testimony whereof, I have hereunto set my hand.

WILLIAM TURNBULL.